(12) United States Patent
Chen et al.

(10) Patent No.: US 11,313,527 B2
(45) Date of Patent: Apr. 26, 2022

(54) ILLUMINATION DEVICE

(71) Applicant: YLX Incorporated, Shenzhen (CN)

(72) Inventors: Bin Chen, Shenzhen (CN); Ru Jiang, Shenzhen (CN); Xianpeng Zhang, Shenzhen (CN)

(73) Assignee: YLX Incorporated, Guangdong (CN)

( * ) Notice: Subject to any disclaimer, the term of this patent is extended or adjusted under 35 U.S.C. 154(b) by 0 days.

(21) Appl. No.: 17/262,614

(22) PCT Filed: Dec. 23, 2019

(86) PCT No.: PCT/CN2019/127259
§ 371 (c)(1),
(2) Date: Jan. 22, 2021

(87) PCT Pub. No.: WO2020/147515
PCT Pub. Date: Jul. 23, 2020

(65) Prior Publication Data
US 2021/0262632 A1   Aug. 26, 2021

(30) Foreign Application Priority Data

Jan. 18, 2019   (CN) .......................... 201910047287.6

(51) Int. Cl.
*F21S 41/24*   (2018.01)
*F21V 29/70*   (2015.01)
(Continued)

(52) U.S. Cl.
CPC ............. *F21S 41/24* (2018.01); *F21S 41/321* (2018.01); *F21V 29/70* (2015.01); *G02B 6/003* (2013.01);
(Continued)

(58) Field of Classification Search
CPC ......... F21S 41/24; F21S 41/321; F21V 29/70; G02B 6/0046; G02B 6/0076
See application file for complete search history.

(56) References Cited

U.S. PATENT DOCUMENTS

2005/0281530 A1* 12/2005 Rizoiu ................... G02B 6/262
                                                                                385/146
2006/0083013 A1*  4/2006 Wanninger ............ F21S 41/148
                                                                                362/509
(Continued)

FOREIGN PATENT DOCUMENTS

CN     102788301     11/2012
CN     103244889      8/2013
(Continued)

OTHER PUBLICATIONS

International Search Report for International Application PCT/CN2019/127259, dated Mar. 24, 2020.
(Continued)

*Primary Examiner* — Bryon T Gyllstrom
*Assistant Examiner* — Christopher E Dunay
(74) *Attorney, Agent, or Firm* — Burris Law, PLLC

(57) ABSTRACT

An illumination device includes a light source and a first light guide. The first light guide includes a first light guide portion and a second light guide portion, and the second light guide portion includes a light-emitting surface. Light emitted by the light source couplingly enters the first light guide portion, and is emitted from the light-emitting surface of the second light guide portion. The cross-sectional area of the second light guide portion is perpendicular to the center line of the first light guide and gradually decreases along the optical axis direction of the light source. The light-emitting surface does not have rotational symmetry. By means of the illumination device, light rays emitted from the light-emitting surface are distributed unevenly in a space. Modifying (Continued)

the distribution of light emitted by the illumination device helps to reduce light loss and increase the utilization of the light.

20 Claims, 6 Drawing Sheets

(51) Int. Cl.
*F21S 41/32* (2018.01)
*F21V 8/00* (2006.01)

(52) U.S. Cl.
CPC ......... *G02B 6/0046* (2013.01); *G02B 6/0055* (2013.01); *G02B 6/0076* (2013.01)

(56) References Cited

U.S. PATENT DOCUMENTS

| | | | | |
|---|---|---|---|---|
| 2007/0145397 | A1* | 6/2007 | DenBaars | H01L 33/58 257/98 |
| 2007/0268715 | A1* | 11/2007 | De Lamberterie | G02B 6/0018 362/514 |
| 2007/0292090 | A1* | 12/2007 | Alphonse | A61B 5/02007 385/119 |
| 2008/0129966 | A1* | 6/2008 | Sato | F21V 7/0025 353/99 |
| 2009/0052189 | A1* | 2/2009 | Kon | F21S 41/148 362/296.01 |
| 2010/0103694 | A1* | 4/2010 | Saxena | G02B 6/0008 362/554 |
| 2012/0195057 | A1* | 8/2012 | Kishimoto | F21S 41/147 362/516 |
| 2013/0027964 | A1 | 1/2013 | Toyota et al. | |
| 2013/0027965 | A1* | 1/2013 | Noh | G02F 1/133308 362/602 |
| 2016/0109627 | A1* | 4/2016 | Yamanaka | F21S 41/176 362/84 |
| 2017/0130923 | A1* | 5/2017 | Nishimura | F21S 41/27 |
| 2017/0343718 | A1* | 11/2017 | Lin | G02B 6/4206 |
| 2020/0198530 | A1* | 6/2020 | Hellin_Navarro | B60Q 1/38 |

FOREIGN PATENT DOCUMENTS

| | | |
|---|---|---|
| CN | 105264287 | 1/2016 |
| CN | 105393048 | 3/2016 |
| CN | 106247255 | 12/2016 |
| CN | 209540617 | 10/2019 |
| JP | 2010086944 | 4/2010 |
| JP | 2013243162 | 12/2013 |
| JP | 2016526751 | 9/2016 |
| JP | 2018137167 | 8/2018 |

OTHER PUBLICATIONS

Office Action issued in corresponding JP Application 2021503602, dated Feb. 4, 2022.

* cited by examiner

ILLUMINATION DEVICE

CROSS-REFERENCE TO RELATED APPLICATIONS

This application is a national phase of International Application No. PCT/CN2019/127259, filed on Dec. 23, 2019, which claims priority to and the benefit of Chinese Application No. 20190047287.6, filed on Jan. 18, 2019. The disclosures of the above applications are incorporated herein by reference.

FIELD

The present disclosure relates to a vehicle illumination device, more particularly, to an illumination device for vehicle lights.

BACKGROUND

The statements in this section merely provide background information related to the present disclosure and may not constitute prior art.

The LED light source has advantages such as energy saving, environmental protection, and long lifetime. However, the existing LED light source is one-surface illuminant, and the lighting characteristic thereof is different from those of traditional filaments for vehicle lights such as a halogen filament or a tungsten filament. Accordingly, the existing LED light source is unable to directly replace traditional filaments. A virtual filament has been provided in the prior art, which introduces the light emitted by the LED light source into a light guiding rod to simulate lighting characteristic of the traditional filaments, so that the virtual filament can directly replace the traditional filaments.

The prior virtual filament includes a light emitting portion having a symmetrical structure, and the illumination light emitted by the light emitting portion is evenly distributed in 360 degrees. When the virtual filament is applied to a light reflecting bowl, a predetermined light distribution pattern can be obtained. The light emitting portion of the virtual filament is provided at a focus of the light reflecting bowl, and the light emitted therefrom in different directions is reflected by different regions of the light reflecting bowl to form different regions of an illumination light pattern. As shown in FIG. 1, the light emitted upwardly from the light emitting portion of the virtual filament illuminates a region above a h-h line of the illumination light pattern after being reflected by an upper reflecting region of the light reflecting bowl. The light emitted downwardly from the light emitting portion illuminates a region below the h-h line of the illumination light pattern after being reflected by a lower reflecting region of the light reflecting bowl.

The main reason for restricting the application of the virtual filament is that the illumination light pattern formed by the virtual filament cannot meet requirements for filaments and bulbs of vehicle headlights, such as a low illuminance in a II region. In the prior art, in order to improve brightness of the light emitted from the virtual filament, a diameter of the light guiding rod may be increased, thereby increasing the number of light sources on a light incident surface of the light guiding rod, so as to increase the luminous flux coupled through the light guiding rod and finally increase brightness of the light emitted from the light emitting portion. However, increase in the diameter of the light guiding rod may increase a degree of defocusing of the light emitting portion at the focus of the light reflecting bowl. In this case, the light upwardly emitted from the light emitting portion is tilted downwardly after being reflected by the upper reflecting region of the light reflecting bowl and then illuminating the region below the h-h line, and the light emitted from the light emitting portion downwardly is tilted upwardly after being reflected by the lower reflecting region of the light reflecting bowl and then illuminating the region above the h-h line. Accordingly, an obtained illuminance of a III region of a low beam pattern does not meet the requirements for the filaments and bulbs of the vehicle headlights.

SUMMARY

This section provides a general summary of the disclosure and is not a comprehensive disclosure of its full scope or all of its features.

The present disclosure provides an illumination device including a light source and a first light guide. The first light guide includes a first light guiding portion and a second light guiding portion. The second light guiding portion includes a light emitting surface, and light emitted by the light source is coupled into the first light guiding portion and emitted from the light emitting surface of the second light guiding portion. A cross-sectional area of the second light guiding portion perpendicular to a center line of the first light guide is gradually decreasing along a direction of an optical axis of the light source. The light emitting surface is not rotationally symmetric.

With the above arrangements, the spatial light distribution of the emitted light is optimized by the light emitting surface, so that the light emitted from the light emitting surface is uneven in spatial distribution. The light distribution of the light emitted by the illumination device is changed so as to reduce light loss and improve light utilization.

In some variations, the light emitting surface is a portion of a side surface of a right cone or a frustum of a right cone.

In some variations, an axis of the right cone or the frustum of the right cone is parallel to and does not coincide with a center line of the first light guiding portion.

In some variations, the second light guiding portion further includes a first reflective surface, and a combining surface of the light emitting surface and the first reflective surface is rotationally symmetric.

In some variations, the light emitting surface is a side surface of an oblique cone or an oblique cone.

In some variations, the light emitting surface of the second light guiding portion is at least a portion of side surfaces of a wedge-shaped body.

In some variations, the second light guiding portion includes a first bottom surface and a second bottom surface which are opposite to each other, the second bottom surface is disposed at a distal end of the second light guiding portion, and the second bottom surface is provided with a second reflective layer.

In some variations, the first light guiding portion has a cylindrical structure or a frustum structure, and the first light guiding portion and the second light guiding portion are integrally formed.

In some variations, a cross-section of the first light guiding portion perpendicular to the center line of the first light guide has a square structure having two rounded corners, and an orthographic projection of a vertex of the second light guiding portion on the cross-section is located on a side away from the two rounded corners.

In some variations, the second light guiding portion includes a third reflective surface, and the third reflective surface and at least a portion of a side surface of the first light guiding portion form a continuous surface.

In some variations, the light emitting surface is provided with a scattering structure and/or a phosphor layer to scatter the light emitted by the light source or change a wavelength thereof.

In some variations, the first light guide further includes: a heat dissipation layer provided on at least a portion of a side surface of the first light guiding portion and configured to dissipate heat of the first light guide; and a transparent adhesive layer configured to adhere the heat dissipation layer to the side surface of the first light guiding portion to conduct the heat of the first light guide to the heat dissipation layer, wherein a refractive index of the transparent adhesive layer is lower than a refractive index of the first light guide.

In some variations, the illumination device further includes an optical lens provided on an optical path between the light source and the first light guide, so that an incident angle of the light emitted by the light source at the first light guide is smaller than a predetermined value.

In some variations, the illumination device further includes a second light guide that is the same as the first light guide. The second light guide includes a third light guiding portion and a fourth light guiding portion, the light emitted by the light source is at least partially coupled into the third light guiding portion and emitted from a light emitting surface of the fourth light guiding portion, and a distal end of the first light guide is disposed oppositely and abuts against to a distal end of the second light guide. With the above arrangements, brightness of the light emitted by the illumination device is doubled.

In some variations, the illumination device further includes a light reflective bowl, the second light guiding portion is provided at a focus of the light reflective bowl, and the light reflective bowl is configured to reflect the light emitted from the light emitting surface to outside. With the above arrangements, a low beam pattern desired by the illumination device can be obtained.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
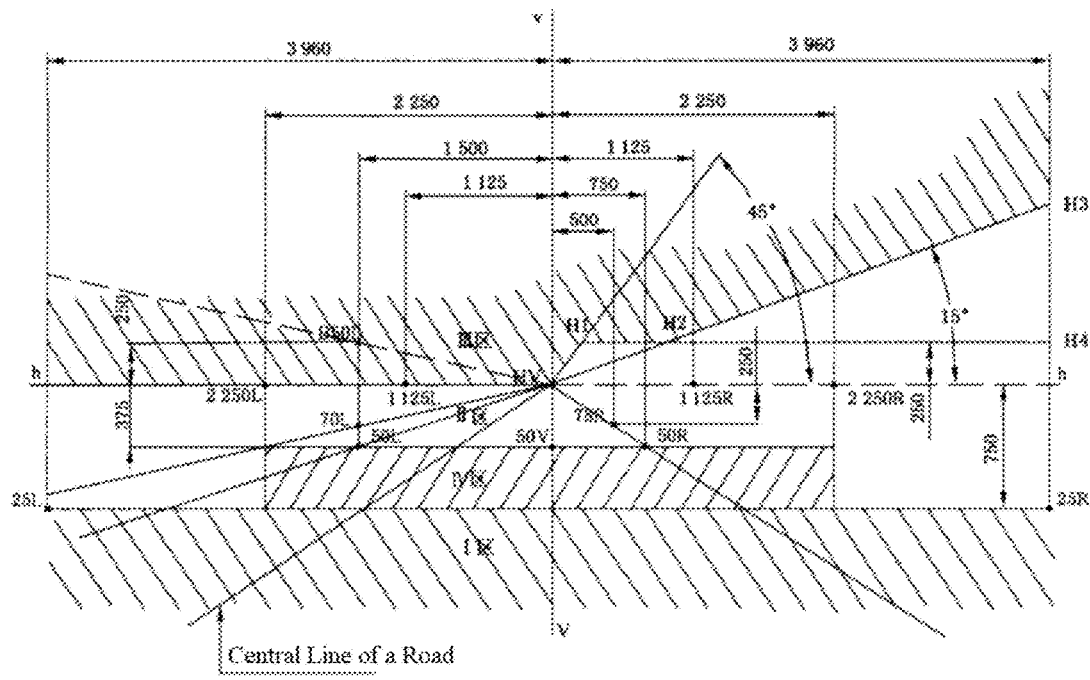
FIG. 1 is a view showing a light distribution pattern of an existing vehicle headlight.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be noted that if there are directional indications (such as up, down, left, right, front, and back) in the present disclosure, the directional indications are only used to explain relative position relations, movement situation, etc. among components under a specific posture (as shown in the drawings). If the specific posture changes, the directional indications may also change accordingly.

In addition, if there are descriptions such as "first", "second", and the like in the present disclosure, the descriptions of "first", "second", and the like are only used for illustrative purposes, instead of indication or implication for its relative importance or implicit indication of the number of technical features. Therefore, the features defined by "first" and "second" may explicitly or implicitly include at least one of the features. In addition, the technical solutions among the various forms can be combined with each other, but they should be achieved by those skilled in the art. When a combination of the technical solutions is contradictory or cannot be achieved, such combination of the technical solutions should be considered to not exist and is not within the scope of the present disclosure.

The "rotationally symmetric" described in the present disclosure means that a target object is rotated by an angle a about an axis and then coincides with itself, where $0° < a < 360°$.

In the prior art, a light barrier is provided so that the illumination light emitted from the virtual filament can form a low beam illumination pattern as shown in FIG. 1. However, the light barrier may result in greater light loss and lower light utilization.

Figure 2:
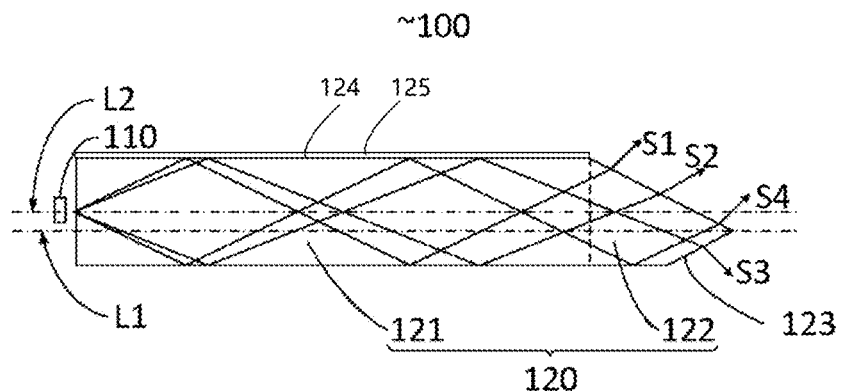
FIG. 2 is a schematic structural view of an illumination device according to a first form of the present disclosure.

Referring to FIG. 2, it is a schematic structural view of an illumination device according to a first form of the present disclosure. The illumination device 100 of this form comprises a light source 110 and a first light guide 120. The first light guide 120 comprises a first light guiding portion 121 and a second light guiding portion 122, and the second light guiding portion 122 comprises a light emitting surface 123. Light emitted by the light source 100 is incident to the first light guiding portion 121, and after being transmitted, is emitted from the light emitting surface 123 of the second light guiding portion 122. In this variation, a cross-section area of the second light guiding portion 122, which is perpendicular to a central axis of the first light guide 120, is gradually decreased along a direction of an optical axis of the light source, and the light emitting surface 123 is not rotationally symmetric.

The light emitted by the light source 110 is incident to the first light guide 120 through a bottom surface of the first light guiding portion 121, is transmitted via TIR (Total Internal Reflection) in the first light guiding portion 121, and is incident to the second light guiding portion 122 from another bottom surface of the first light guiding portion 121. A part of the light, such as light S1, S2, and S3, is directly emitted from the light emitting surface 123 of the second light guiding portion 122. Another less part of the light, such as S4, is totally internally reflected on a column surface of the second light guiding portion 122, and then is emitted from the light emitting surface 123. In the above arrangement, the light emitted from the light emitting surface 123 is uneven in spatial distribution. The light distribution of the light emitted from the light emitting surface 123 is changed so as to reduce light loss and improve light utilization.

In this variation, the light source 110 may be an LED light source, a laser light source or other solid-state light source, and the light source 110 is composed of at least one of the above-mentioned light sources. For example, the light source 110 comprises four LED chips in a specific variation of the present disclosure.

The first light guide 120 may be made of a material with good light transmittance, such as PMMA, quartz, glass, sapphire, YAG single crystal, etc. In this variation, the light is transmitted in the first light guide 120 in a total internal reflection manner, which not only has an extremely high reflectivity, but also can reduce process complexity caused by coating with a reflective film or the like. It can be understood that in some other variations of the present disclosure, a portion of the surface of the first light guide may be provided with a reflective film to achieve light transmission. The main difference among those variations lies in the preparation process, which will not be described herein.

The light emitting surface 123 is provided with a scattering structure 126. For example, the scattering structure 126 may be formed by roughening a conical surface of the second light guiding portion 122, micro-structuring the conical surface of the second light guiding portion 122, or coating a scattering layer 127 on the conical surface of the second light guiding portion 122.

In some variations of the present disclosure, the scattering layer 127 includes scattering particles 128 and a carrier 129. A refractive index of the carrier is greater than that of the first light guide, so that the scattering layer becomes a scattering surface and the light can be emitted from the light emitting surface 123. Specifically, the scattering layer 127 may be, for example, a mixture of coated titanium oxide powder and glue or glass. The refractive index of the glue or glass is greater than a refractive index of the second light guiding portion, thereby forming the light emitting surface 123. Accordingly, the light can be scattered outwardly to form illumination light.

In one form, the light emitting surface 123 may be formed by providing a phosphor layer on the conical surface of the second light guiding portion 122. The phosphor layer may be formed by mixing a phosphor powder and a carrier thereof. The carrier may be glue, glass, and the like. The phosphor powder may be, for example, a yellow phosphor powder, a green phosphor powder, a red phosphor powder, or a mixture thereof. In a specific form, a wavelength of the light emitted by the light source is converted by exciting the phosphor powder so as to form the illumination light.

In the present disclosure, the first light guide comprises the first light guiding portion and the second light guiding portion. In some forms, the first light guiding portion and the second light guiding portion may be defined as below. The first light guide is divided into two portions by a plane perpendicular to an optical axis of the light source (or a center line of the first light guiding portion) and tangent to the light emitting surface. One of the two portions of the first light guide close to the light source does not include the light emitting surface and is the first light guiding portion, and the other of the two portions away from the light source is the second light guiding portion including the light emitting surface.

The first light guiding portion 121 and the second light guiding portion 122 of the first light guide 120 may be integrally formed, or may be formed separately and then glued into one piece. When the first light guiding portion 121 and the second light guiding portion 122 are integrally formed, the second light guiding portion 122 further includes a third reflective surface (not shown in the drawings). The third reflective surface and at least a portion of a side surface of the first light guiding portion form a continuous surface. In this case, the third reflective surface is an extension surface of a total internal reflective surface of the first light guiding portion 121. In the present disclosure, for the technical solution in which the first light guiding portion and the second light guiding portion are integrally formed, the first light guide may be formed by processing an original light guide. For example, one end of a cylindrical light guide is polished to be a circular cone/circular truncated shape, that is, a first light guide composed of a first light guiding portion and a second light guiding portion is obtained.

Specifically, as shown in FIGS. 3(a) and 3(b), FIG. 3(a) is a perspective view of the first light guide 120, and FIG. 3(b) is a right side view of the first light guide 120. The first light guide 120 comprises the first light guiding portion 121 and the second light guiding portion 122. The first light guiding portion 121 has a cylindrical structure including two bottom surfaces and a cylindrical surface. The second light guiding portion 122 has a structure including a bottom surface, a partial conical surface and a partial cylindrical surface. The partial conical surface is the light emitting surface 123, which is a portion of a side surface of a right cone (not a complete conic surface). An area of each of the two bottom surfaces of the first light guiding portion 121 is equal to an area of the bottom surface of the second light guiding portion 122 to realize connection between the first light guiding portion 121 and the second light guiding portion 122 (in the technical solution in which the first light guiding portion and the second light guiding portion are integrally formed, the bottom surfaces between the first light guiding portion 121 and the second light guiding portion 122 are virtual surfaces), which corresponds to a position of the dotted line in FIG. 2. In this form, the first light guiding portion 121 is a cylinder with a smallest length that is formed by being intercepted by an intersecting line passing through the cylinder and the circular cone and perpendicular to the center line L2 of the first light guiding portion 121. The second light guiding portion 122 is a portion of the light guide 120 except for the first light guiding portion 121. A straight line passes through a vertex or a midpoint of a distal end of the second light guiding portion 122 and is perpendicular to the bottom surface of the second light guiding portion 122, and the straight line is indicated by L1. In this variation, the light emitting surface 123 is a part of the conical surface, and L1 is an axis of the right circular cone corresponding to the conical surface. The light emitting surface 123 does not coincide with itself after rotating at any angle a (0°<a<360°) about the straight line L1. The straight line L1 is parallel to the straight line L2 and they do not overlap each other.

Figure 4:
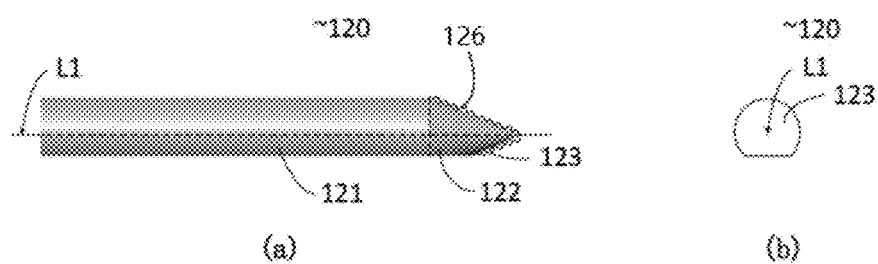
FIG. 4 is a schematic structural view of a first light guide according to a modification of the first form of the present disclosure.
Figure 5:
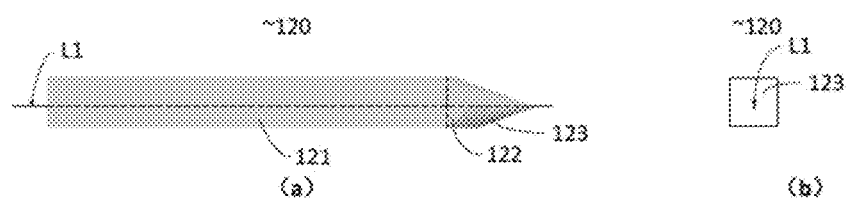
FIG. 5 is a schematic structural view of a first light guide according to another modification of the first form of the present disclosure.
Figure 6:
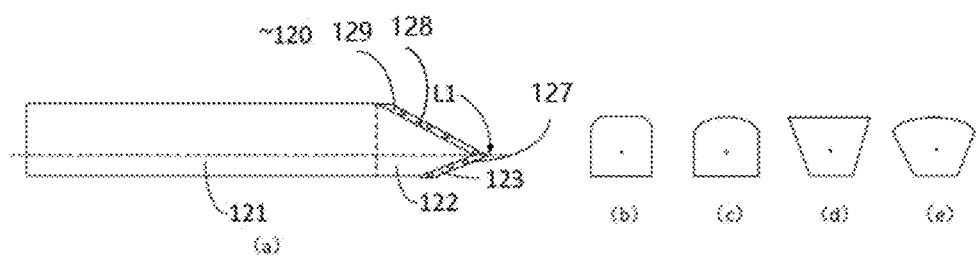
FIG. 6 is a schematic structural view of a first light guide according to another modification of the first form of the present disclosure.

In a modification of the first variation of the present disclosure, the first light guide 120 may also have other shapes with reference to FIGS. 4 to 6. The modified structure of the first light guide is mainly described thereinafter, and other technical features of the illumination device can be appreciated with reference to the above description.

As shown in FIGS. 4(a) and 4(b), the first light guide 120 comprises the first light guiding portion 121 and the second light guiding portion 122. The first light guiding portion 121 has a cylindrical structure including two bottom surfaces, one cylindrical surface and a side plane. The two bottom surfaces have a shape like "D", which is formed by cutting a small portion from a whole circle along a straight line that does not pass through a center of the circle. The second light guiding portion 122 has a structure including a bottom surface, a partial conical surface and a side plane. The partial conical surface is the light emitting surface 123. Also, the partial conical surface is a portion of a conical surface of a right circular cone (not a complete conical surface). The bottom surface of the second light guiding portion 122 has a shape and a size same as those of the first light guiding portion 121, so as to realize connection of the first light guiding portion 121 and the second light guiding portion 122. Specifically, the first light guide 120 may be formed by cutting a portion of the original light guide along a plane parallel to the center line of the light guide while not passing through the center line, wherein the original light guide is integrally formed by a cylinder and a circular cone and is configured to be rotationally symmetric about the center line. Alternatively, the first light guide 120 may be formed by polishing a side surface of the original light guide that is integrally formed by the cylinder and the circular cone and is configured to be rotationally symmetric about the center line. In this case, the second light guiding portion further comprises the third reflective surface (not shown in the drawings). The third reflective surface and at least part of the side surfaces of the first light guiding portion 121 form a continuous surface, and the third reflective surface is the aforementioned side plane.

As shown in FIGS. 5(a) and 5(b), the first light guiding portion 121 of the first light guide 120 is a quadrangular prism including two bottom surfaces and four side planes, in which a shape of each of the two bottom surfaces is square. The second light guiding portion 122 has a structure including a bottom surface, a partial conical surface and four side planes, the partial conical surface is the light emitting surface 123, and the partial conical surface is also a part of a conical surface of a right circular cone (not a complete conical surface).

As shown in FIG. 6, FIG. 6(a) is a front view of the first light guide 120, and FIGS. 6(b), 6(c), 6(d), and 6(e) are right side views of the first light guide 120 and show other three structures of the first light guide 120. Since the cross-section area of the second light guiding portion, which is perpendicular to the center line of the first light guide, is gradually decreasing along a direction of the optical axis of the light source, the right side views 6(b), 6(c), 6(d), and 6(e) can actually be considered as right side views of the first light guiding portion. In the variation shown in FIG. 6, the first light guiding portion 121 has a columnar structure. Therefore, FIGS. 6(b), 6(c), 6(d), and 6(e) also show the cross-section of the columnar structure of the first light guiding portion 121. For example, as shown in FIG. 6(b), the first light guiding portion 121 of the first light guide 120 has a columnar structure including two bottom surfaces, four side planes and two arc surfaces, and the arc surfaces are provided at one side away from the straight line L1. That is, the cross-section of the first light guiding portion 121 perpendicular to the center line of the first light guide 120 has a square structure with two rounded corners. An orthographic projection of the vertex of the second light guiding portion 122 on the cross-section is located at one side away from the two rounded corners. As centered on the center line of the first light guide 121, the two rounded corners and the orthographic projection of the vertex are respectively located on both sides of the center line. With this structure, when the illumination device is applied with a light reflective bowl or other secondary optical elements, the illumination device achieves a higher light utilization and a higher central illuminance of the formed illumination spot. It can be understood that when the distal end of the second light guiding portion is a line or a plane instead of a point, the vertex of the second light guiding portion can be regarded as the midpoint of the distal end of the second light guiding portion.

It can be understood that the structure of the first light guiding portion in the present disclosure is not limited thereto, it may be a columnar structure, for example, including the cylinders, prisms and their mixtures listed above, or a frustum structure, such as a circular truncated cone structure, a truncated prism structure or the like.

In the above-mentioned first variation of the present disclosure and modifications thereof, the first light guiding portion of various structures is illustrated. The first light guiding portion is configured to homogenize light emitted from the light source so as to allow the light incident to the second light guiding portion to have a uniform light field. In the above variations, common aspects of the respective second light guiding portions are in that all of the structures thereof include a portion of a right circular cone and the side surface of the "incomplete right circular cone" is the light emitting surface of the second light guiding portion. That is, the light emitting surface is an "incomplete right circular conical surface". With the above arrangement, the light emitting surface 123 can rotate asymmetrically about the straight line L1, so that the light emitted from the light emitting surface 123 is uneven in spatial distribution.

It can be understood that in some other variations, the above "right circular cone" can be replaced with a "right pyramid", and the circular cone is regarded as a pyramid of which a number of edges is infinite. In this case, the light emitting surface is a portion of the side surface of the right pyramid, which is an "incomplete right pyramid surface". In general, the light emitting surface may be a portion of the side surface of a right cone. The right cone comprises a right circular cone and a right pyramid, as well as other right cone structures (the orthographic projection of the vertex of the cone on the bottom surface of the cone coincides with the center of the bottom surface of the cone).

The first light guiding portion 121 of the first light guide 120 of this variation further comprises a transparent adhesive layer 124 and a heat dissipation layer 125. The heat dissipation layer 125 is provided on at least a portion of an outer surface of the first light guiding portion, and is used to dissipate heat of the first light guide 120. The transparent adhesive layer 124 is used to adhere the first light guiding portion and the heat dissipation layer 125 to conduct heat from the first light guiding portion to the heat dissipation layer 125 A refractive index of the transparent adhesive layer 124 is lower than that of the first light guiding portion, so that the light emitted by the light source can be totally internally reflected at an interface between the first light guiding portion and the transparent adhesive layer 124 so as to reduce light loss.

Figure 7:
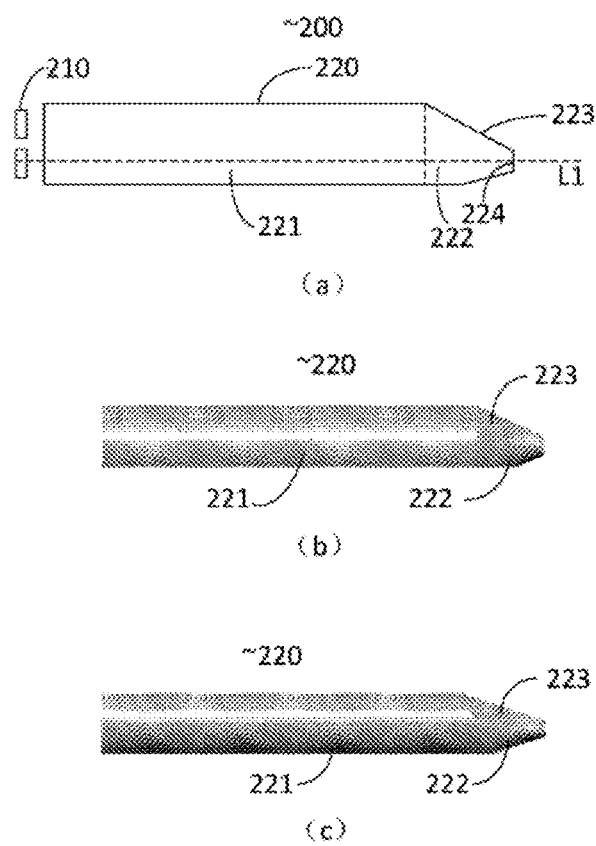
FIG. 7 is a schematic structural view of an illumination device and a first light guide according to a second form of the present disclosure.

Referring to FIGS. 7(*a*), 7(*b*) and 7(*c*), FIG. 7 (*a*) is a schematic structural view of an illumination device according to a second variation of the present disclosure, FIG. 7 (*b*) is a schematic structural view of a first light guide of the illumination device according to the second variation of the present disclosure, and FIG. 7(*c*) is a schematic structural view of another first light guide of the illumination device according to the second form of the disclosure. The illumination device 200 comprises a light source 210, and a first light guide 220, and the light source 210 can be comprehended with reference to the description in the foregoing variations, which will not be repeated herein. The illumination device 200 of this variation differs from the illumination device 100 in the foregoing variations mainly in that the first light guide comprises a second light guiding portion with a different structure. Specifically, the second light guiding portion 222 of the first light guide 220 of this form is a portion of a truncated circular cone, which has a structure formed by cutting off a tip of a corresponding cone (that is a portion near the vertex) on the basis of the above forms. The following description mainly illustrates the specific structure of the second light guiding portion 222. For the first light guiding portion 221 of the first light guide 220 in this form, one can make a reference to the technical solutions of the first light guiding portion 121 of the first light guide 120 in the above variations.

As shown in FIG. 7(*b*), the second light guiding portion 222 of the first light guide 220 is a portion of a truncated circular cone structure, which comprises two bottom surfaces, a conical surface, and a cylindrical surface. The conical surface is a light emitting surface 223. As shown in FIG. 7(*c*), the second light guiding portion 222 of the first light guide 220 has a truncated circular cone structure, which includes two bottom surfaces, a conical surface and a side plane, and the conical surface is the light emitting surface 223.

The two bottom surfaces of the second light guiding portion 222 are disposed opposite to each other. One of the two bottom surfaces with a larger area is a first bottom surface that is connected to the first light guiding portion 221. The other of the two bottom surfaces with a smaller area is a second bottom surface that is disposed at a distal end of the second light guiding portion 222. The second bottom surface is provided with a second reflective layer 224, which can reflect excitation light emitted from the second bottom surface of the second light guiding portion 222 back to the light guide so as to improve light utilization.

The second reflective layer 224 may be configured to be a diffuse reflection layer or a Gaussian scattering reflection layer. Diffuse reflection means that a light beam is in Lambertian distribution after being reflected by the reflective layer and intensity of the reflected light is in cosine distribution. A material of the diffuse reflection layer may be a mixture of particles, such as $TiO_2$, MgO, $BaSO_4$, and glue or glass powder. Gaussian scattering reflection means that a light beam is in Gaussian distribution after being reflected by the reflective layer and intensity of the reflected light is in Gaussian distribution. The second reflective layer 224 can reflect the light transmitted thereon to allow the reflected light to be emitted from the light emitting surface 223.

In other variations, the above "truncated right circular cone" may be replaced with "truncated right pyramid", and the truncated circular cone is regarded as a truncated pyramid of which a number of edges is infinite. In this case, the light emitting surface is a portion of the side surface of the truncated right pyramid, which is a "surface of an incomplete truncated right pyramid". In general, the light emitting surface may be a portion of a side surface of a right frustum. The right frustum comprises a truncated right circular cone and a truncated right pyramid, as well as other right frustum structures.

It can be understood that in the present disclosure, the technical solution of the second light guiding portion, which is provided the second bottom surface with the second reflective layer at the distal end of the second light guiding portion, is not limited to the technical solution that the second light guiding portion is a portion of the frustum. In other variations of the present disclosure, the second bottom surface may also be inclined with respect to the direction of the optical axis of the light source, rather than perpendicular to the direction of the optical axis of the light source. The second bottom surface may also be formed by obliquely cutting off the tip of the corresponding cone according to the first form and its modifications. The shape of the second bottom surface is not limited to a planar structure, and may also be a curved structure.

Figure 8:
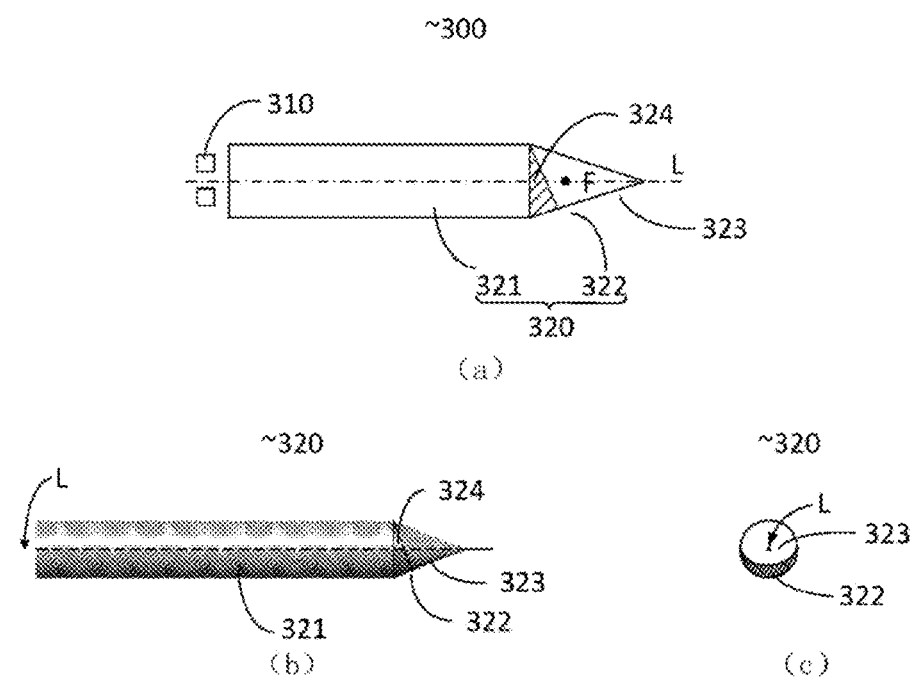
FIG. 8 is a schematic structural view of an illumination device and a first light guide according to a third form of the present disclosure.

Referring to FIGS. 8(*a*), 8(*b*) and 8(*c*), FIG. 8 (*a*) is a schematic structural view of an illumination device according to a third form of the present disclosure, FIG. 8 (*b*) is a schematic structural view of a first light guide of the illumination device according to the third variation of the present disclosure, and FIG. 8(*c*) is a right side view of the first light guide. The illumination device 300 according to this form comprises a light source 310 and a first light guide 320, in which the light source 310 is the same as that described in the aforementioned variations, and will not be repeated herein. The first light guide 320 comprises a first light guiding portion 321 and a second light guiding portion 322. A cross-section area of the second light guiding portion 322, which is perpendicular to a central axis of the first light guide 320, is gradually decreasing along a direction of an optical axis of the light source, and the second light guiding portion is rotationally symmetric about the central axis L. The second light guiding portion 322 comprises a light emitting surface 323 and a first reflective surface 324, and a combined surface of the light emitting surface 323 and the first reflective surface 324 is rotationally symmetric.

Specifically, as shown in FIGS. 8(*b*) and 8(*c*), the first light guide 320 comprises a first light guiding portion 321 and a second light guiding portion 322. The first light guiding portion 321 comprises two bottom surfaces and a cylindrical surface. The second light guiding portion 322 has a right circular cone structure that comprises a bottom surface and a conical surface. The conical surface of the second light guiding portion 322 is provided with a light emitting surface 323 and a light reflective surface 324. Each of the two bottom surfaces of the first light guiding portion 321 and the bottom surface of the second light guiding portion 322 have the same size to realize connection between the first light guiding portion 321 and the second light guiding portion 322. A portion of the conical surface of the second light guiding portion 322 is configured to be the first reflective surface 324 such that the light emitting surface 323 rotates asymmetrically about the center line of the light guide, thereby causing the light emitted from the light emitting surface 323 to be uneven in spatial distribution. Further, the first reflective surface 324 is used to guide the light onto the light emitting surface that is opposite to the first reflective surface, and thus the spatial distribution of the emitted light is further changed. Compared with the above forms, since the first light guiding portion 321 and the second light guiding portion 322 of the first light guide 320 are rotationally symmetric in this variation, processing of the light guide is simpler.

In addition, the first light guiding portion 321 of the first light guide 320 may also have other structures, such as a truncated pyramid, a truncated circular cone structure, or a prism structure. The second light guiding portion 322 may also have a truncated circular cone structure, a pyramid structure, or a truncated pyramid structure and so on. In a practical application scenario, the second light guiding portion may not include the first reflective surface 324 in order to simplify the manufacturing process of the first light guide 320. A second bottom surface of the second light guiding portion 321 having a frustum structure may be configured to be inclined with respect to the direction of the optical axis of the light source, rather than perpendicular thereto, and the conical surface is the light emitting surface. In this case, the light emitting surface is not rotationally symmetric. In this way, the light emitted from the light emitting surface is uneven in spatial distribution.

In this variation, the light emitted by the light source 310 is coupled into the first light guiding portion 321 and thus incident to the first light guide 320, and is emitted from the light emitting surface 323 of the second light guiding portion 322 or reflected by the first reflective surface 324 of the second light guiding portion 322. Most of the light will be emitted from the light emitting surface 323, and a less part of the light is transmitted to the first reflective surface 324, and then is reflected by the light emitting surface 323 and emitted to outside.

Figure 9:
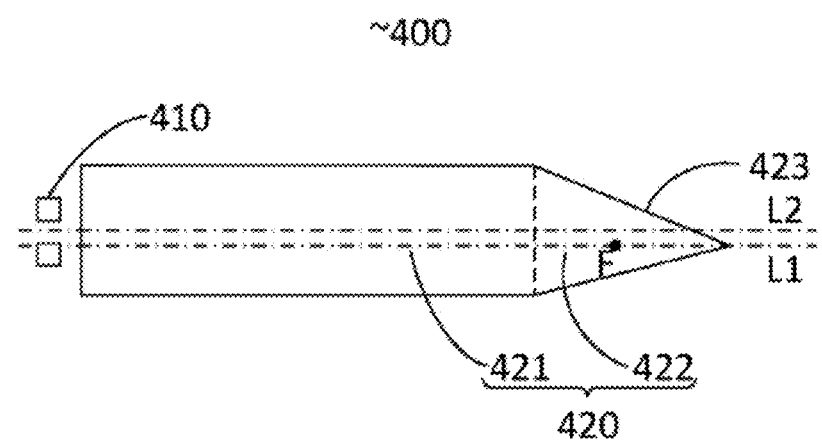
FIG. 9 is a schematic structural view of an illumination device according to a fourth form of the present disclosure.

Referring to FIG. 9, FIG. 9 is a schematic structural view of an illumination device according to a fourth variation of the present disclosure. The illumination device 400 of this variation comprises a light source 410 and a first light guide 420, in which the light source 410 is the same as that described in the aforementioned variations and will not be repeated herein. The first light guide 420 comprises a first light guiding portion 421 and a second light guiding portion 422. A cross-section area of the second light guiding portion 422, which is perpendicular to a central axis of the first light guide 420, is gradually decreasing along the direction of optical axis of the light source. The second light guiding portion 422 comprises a light emitting surface 423, which is not rotationally symmetric.

Figure 10:
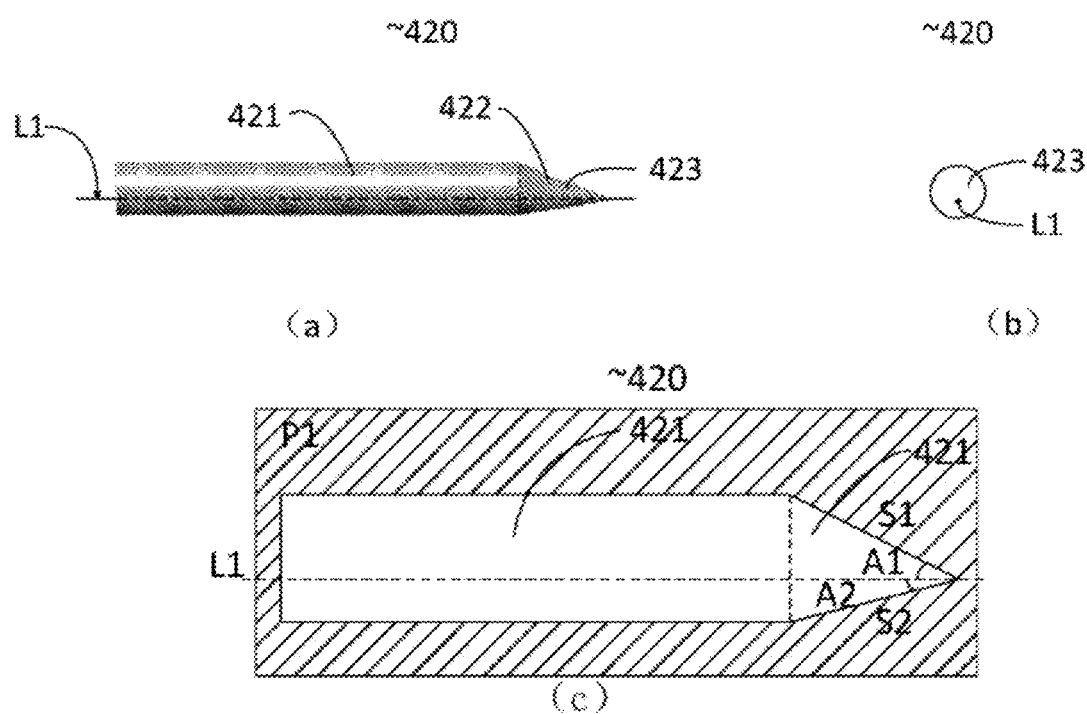
FIG. 10 is a schematic structural view of a first light guide in the fourth form of the present disclosure.

In this variation, as shown in FIGS. 10(a), 10(b) and 10(c), FIG. 10(a) is a perspective view of the first light guide 420, FIG. 10 (b) is a right side view of the first light guide 420, and FIG. 10(c) is a sectional view of the first light guide 420. The first light guide 420 comprises a first light guiding portion 421 and a second light guiding portion 422. The first light guiding portion 421 has a cylindrical structure that comprises two bottom surfaces and a cylindrical surface. The second light guiding portion 422 has an oblique circular cone structure that comprises a bottom surface and a conical surface, and the conical surface is the light emitting surface 423. An area of each of the two bottom surfaces of the first light guiding portion 421 is the same as that of the bottom surface of the second light guiding portion 422, so as to realize connection between the first light guiding portion 421 and the second light guiding portion 422. Referring to FIG. 10(c), any of planes P1 passing through a straight line L1 intersects with the light emitting surface 423 of the second light guiding portion 422 to form intersection lines S1 and S2. An angle formed by the intersection line S1 and the straight line L1 is A1, and an angle formed by the intersection line S2 and the straight line L1 is A2, where A1 is not equal to A2. In this variation, at most one A1 is equal to one A2. In this way, the light emitting surface 423 is rotationally asymmetric about the straight line L1, so that the light emitted from the light emitting surface 423 is uneven in spatial distribution.

In other variations, the above "oblique circular cone" may be replaced with "oblique pyramid", and the circular cone is regarded as a pyramid of which a number of edges is infinite. In this case, the light emitting surface is a side surface of the oblique truncated pyramid. In general, the light emitting surface may be a side surface of an oblique taper. The oblique taper comprises the oblique cone and the oblique pyramid, as well as other oblique taper structures.

In addition, the first light guiding portion 421 of the first light guide 420 may also have other structures, such as a truncated pyramidal, a truncated circular cone structure, or a prism structure. The second light guiding portion 422 may also be a truncated circular cone, a truncated pyramid or other oblique frustum structure. In this technical solution, the second light guiding portion 422 comprises a second bottom surface provided with a second reflective layer.

Figure 11:
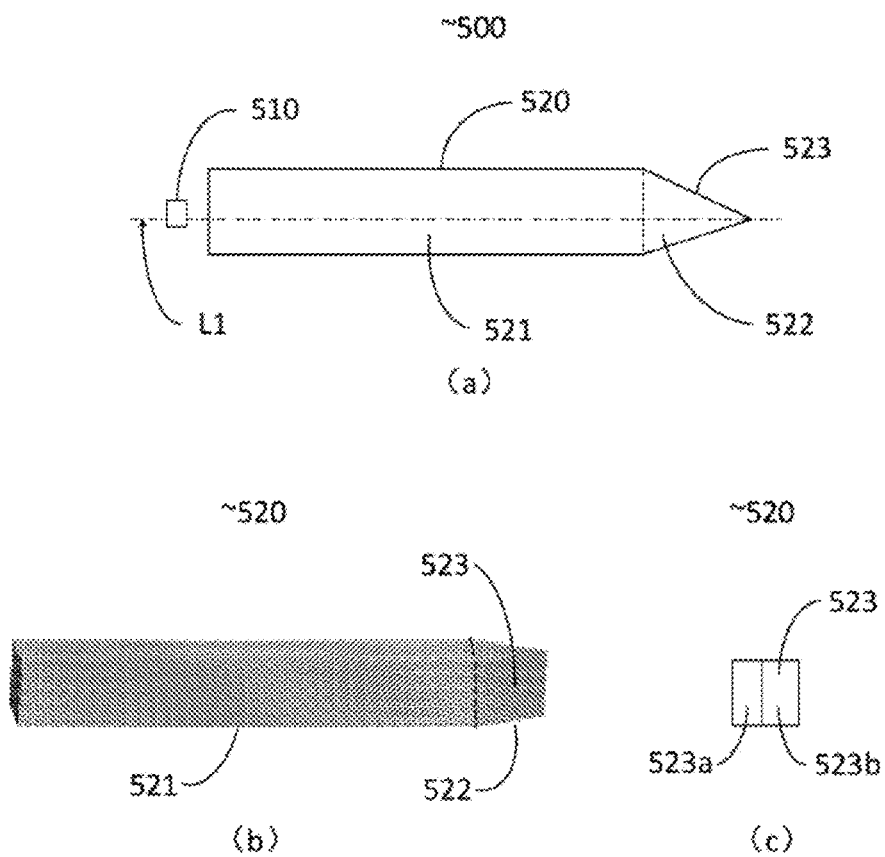
FIG. 11 is a schematic structural view of an illumination device and a first light guide according to a fifth form of the present disclosure.

Referring to FIGS. 11(a), 11(b) and 11(c), FIG. 11 (a) is a schematic structural view of an illumination device according to a fifth variation of the present disclosure, and FIG. 11 (b) is a schematic structural view of a first light guide of the illumination device according to the fifth variation of the present disclosure, and FIG. 11(c) is a right side view of the first light guide. The illumination device 500 of this variation comprises a light source 510 and a first light guide 520, in which the light source 510 is the same as that described in the foregoing forms and will not be repeated herein. The first light guide 520 comprises a first light guiding portion 521 and a second light guiding portion 522. A cross-sectional area of the second light guiding portion 522, which is perpendicular to a central axis of the first light guide 520, is gradually decreasing along the direction of optical axis of the light source. The second light guiding portion 522 comprises a light emitting surface 523, which is not rotationally symmetric.

As shown in FIGS. 11(b) and 11(c), the first light guiding portion 521 of the first light guide 520 is a quadrangular prism including two bottom surfaces and four side planes, and each of the two bottom surfaces is square. The second light guiding portion 522 is a wedge that comprises a bottom surface and four side surfaces, and at least a portion of the side surfaces is the light emitting surface 523. In this variation, the second light guiding portion 522 comprises two sub-light emitting surfaces 523a and 523b, and an orthogonal projection of an intersection line of the sub-light emitting surface 523a and the sub-light emitting surface 523b, which is projected on the bottom surface of the second light guiding portion 522, divides the bottom surface into two shapes having different sizes. In a specific application, the orthogonal projection of the intersection line between the sub-light emitting surface 523a and the sub-light emitting surface 523b, which is projected on the bottom surface of the second light guiding portion, divides the bottom surface into two shapes having the same size. The bottom surface of the second light guiding portion 522 and the bottom surfaces of the first light guiding portion 521 have the same shape and size, so as to realize connection between the first light guiding portion 521 and the second light guiding portion 522. With the above arrangements, light emitted from the light emitting surface 523 is even in spatial distribution.

In other forms, the second light guiding portion 522 may also have another wedge-shaped structure, so that the second light guiding portion comprises three or more sub-light emitting surfaces. An inclination angle of each of the sub-light emitting surfaces relative to the central axis of the first light guide may be changed such that a shape of the orthographic projection of the intersection line of the sub-light emitting surfaces on the bottom surface of the second light guiding portion may be changed. Therefore, the light emitted from the light emitting surfaces is uneven in spatial distribution. In addition, the first light guiding portion 521 of the first light guide 520 may also have other structures, such as a truncated pyramid structure, a truncated circular cone structure, or a cylindrical structure.

Figure 3:
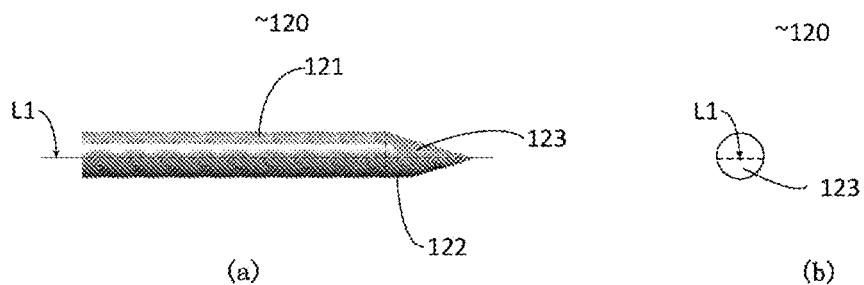
FIG. 3 is a schematic structural view of a first light guide in the first form of the present disclosure.

To sum up, the first light guiding portion of the first light guide may be a cylindrical structure or a frustum structure. Further, the second light guiding portion may be a right cone structure or a portion of a right frustum structure, or a partial or entire oblique cone structure or a partial or entire oblique frustum structure, or may be a partial or entire wedge structure. In order to facilitate understanding, the second light guiding portion can be simply regarded as a structure formed by a spatial intersection of a right taper structure, a right frustum structure, an oblique taper structure, an oblique frustum structure or a wedge structure and a cylindrical structure or a frustum structure of the first light guiding portion. For example, the second light guiding portion of the first light guide shown in FIG. 3 is a spatial intersection of a cylinder and a right circular cone, the second light guiding portion of the first light guide shown in FIG. 5 is a spatial intersection of a quadrangular prism and a right circular cone, the second light guiding portion of the first light guide shown in FIG. 7 is a spatial intersection of a cylinder and a truncated right circular cone, the second light guiding portion of the first light guide shown in FIG. 10 is a spatial intersection of a cylinder and an oblique circular cone, and the second light guiding portion of the first light guide shown in FIG. 11 is a spatial intersection of a quadrangular pyramid and a wedge. The structure of the second light guiding portion is not limited thereto. With this spatial superposition, the "intercepted" second light guiding portion has a spatially non-rotationally symmetric structure (except for the form shown in FIG. 8), such that the surface is not rotationally symmetric. Accordingly, the emitted light is uneven in spatial distribution.

Figure 12:
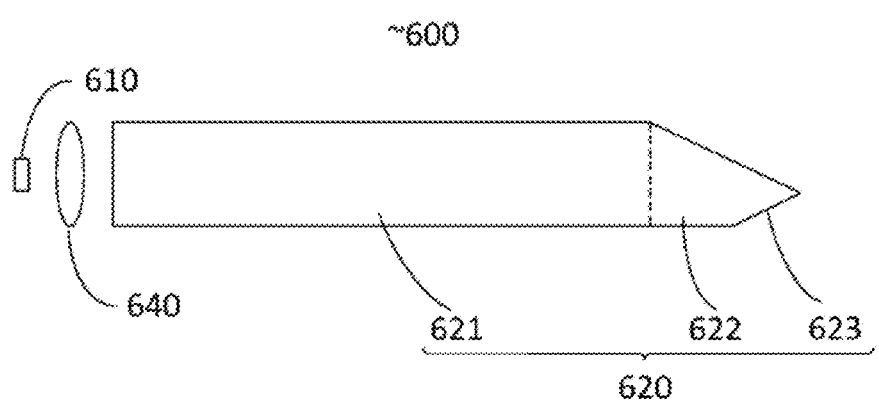
FIG. 12 is a schematic structural view of an illumination device according to a sixth form of the present disclosure.

Referring to FIG. 12, it is a schematic structural view of an illumination device according to a sixth variation of the present disclosure. The illumination device 600 of this variation comprises a light source 610, an optical lens 640, and a first light guide 620. The light source 610 is the same as that described in the above variations, and the first light guide 620 may be the first light guide (schematically shown in the drawing) described in any one of the above variations, and they are not described herein. The optical lens 640 is arranged on an optical path between the light source 610 and the first light guide 620, and is configured to collect light emitted by the light source 620. Accordingly, an incident angle of the light emitted by the light source 610 at the first light guide 620 is smaller than a predetermined value, and thus more light can be incident at the first light guide 620 and meet requirement for the total internal reflective angle, which improves light utilization.

Specifically, when the first light guiding portion 621 of the first light guide 620 has a columnar structure, the optical lens 640 allows the incident angle β incident at the first light guide 620 to meet $\beta < \arcsin\sqrt{n^2-1}$, where n is a refractive index of the first light guide 620.

Figure 13:
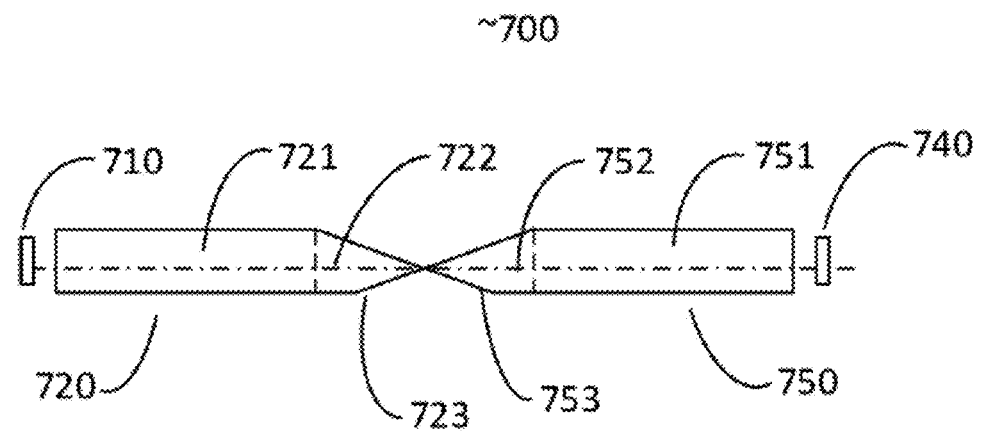
FIG. 13 is a schematic structural view of an illumination device according to a seventh form of the present disclosure.

In order to further improve brightness of the emitted light of an illumination device, in a seventh form as shown in FIG. 13, an illumination device 700 of this variation comprises a light source (including two sub-light sources 710 and 740), a first light guide 720, and a second light guide 750. The second light guide is the same as the first light guide described in any one of the above variations. The first light guide 720 comprises a first light guiding portion 721 and a second light guiding portion 722, and the second light guide 750 comprises a third light guiding portion 751 and a fourth light guiding portion 752. Light emitted by the sub-light source 740 is coupled into the third light guiding portion 751, and is emitted from a light emitting surface of the fourth light guiding portion 752. A distal end of the second light guiding portion 722 is disposed oppositely and abuts against a distal end of the fourth light guiding portion 752, and both of the second light guiding portion 722 and the fourth light guiding portion 752 are located at a focus of a light reflective bowl 730. With the above arrangements, brightness of the light emitted by the illumination device is doubled.

In a modified variation of the sixth variation, the third light guiding portion of the second light guide may be bent (for example, bent into a U shape), so that the distal end of the fourth light guiding portion and the distal end of the second light guiding portion are opposite to each other. Accordingly, the two sub-light sources are located on the same side, which is convenient for circuit wiring.

Figure 14:
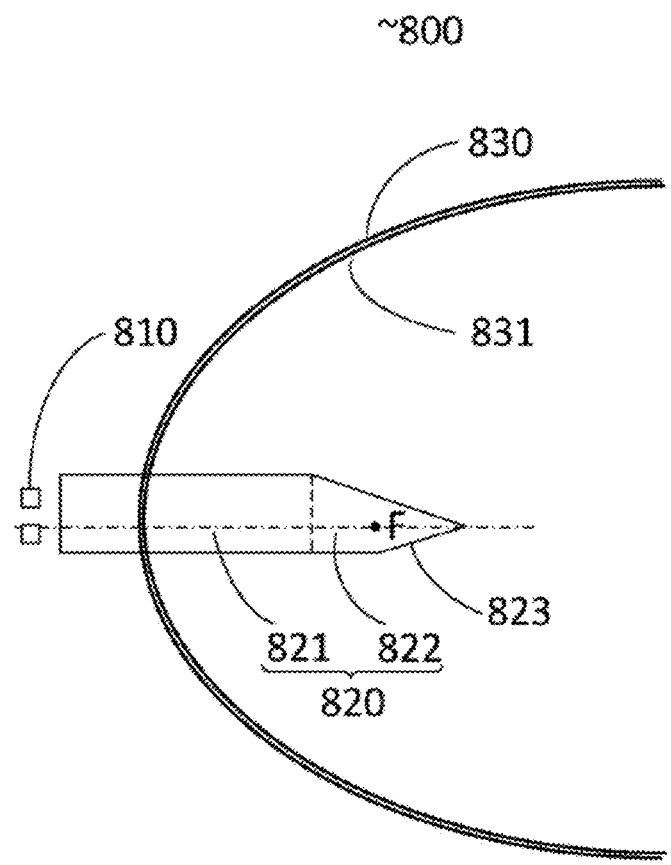
FIG. 14 is a schematic structural view of an illumination device according to an eighth form of the present disclosure.

Referring to FIG. 14, it is a schematic structural view of an illumination device according to an eighth form of the present disclosure. The illumination device 800 of this variation comprises a light source 810, a first light guide 820, and a light reflective bowl 830. The light source 810 is the same as the light source in the above forms, and the first light guide 820 is the first light guide described in any one of the above forms. FIG. 14 only exemplarily shows a structure similar to the first light guide as shown in FIG. 3, and is not a limitation to the structure thereof. The detailed description thereof can be referred to the description in the above variations, and will not be described herein. The light reflective bowl 830 is a curved light reflective bowl, such as a paraboloidal light reflective bowl or an ellipsoidal light reflective bowl. The light reflective bowl 830 is provided with a reflective region 831 therein. The reflective region 831 may be formed by providing a high reflectivity film inside the light reflective bowl 830, such as a reflective silver layer, and a reflective aluminum layer. The second light guiding portion 822 of the first light guide 820 is disposed at a focus of the light reflective bowl 830.

In this form, light emitted by the light source 810 is coupled into the first light guide 820 through the first light guiding portion 821, and is emitted from the light emitting surface 823 of the second light guiding portion 822, and then is reflected by the reflective region 831 of the light reflective bowl 830 to outside so as to form illumination light.

With the above arrangements, illumination in each area of an illumination light pattern, which is formed after being reflected by the light reflective bowl, can meet requirements, and light utilization of the illumination device is high.

In view of the above, the present disclosure provides an illumination device that comprises a light source and a first light guide. A second light guiding portion of the first light guide includes a light emitting surface. The light emitting surface is configured to be not rotationally symmetric, such that light emitted from the light emitting surface is uneven in distribution. The light distribution of the light emitted by the illumination device is changed to reduce light loss and improve light utilization.

The various forms in this description are described in a progressive manner. Each variation focuses on the differences from other forms, and the same or similar parts among the various variations can be referred to each other.

The above descriptions are only variations of the present disclosure, and do not limit the scope of the present disclosure. Any equivalent structure or equivalent process transformation made by using the content of the description and drawings of the present disclosure or directly or indirectly applied to other related technical fields are all included in the scope defined by the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An illumination device, comprising:
   a light source;
   a first light guide comprising a first light guiding portion and a second light guiding portion; and
   an optical lens,
   wherein the second light guiding portion comprises a light emitting surface, and light emitted by the light source is at least partially coupled into the first light guiding portion and emitted from the light emitting surface of the second light guiding portion,
   wherein a cross sectional area of the second light guiding portion perpendicular to a center line of the first light guide is gradually decreasing along a direction of an optical axis of the light source,
   wherein the light emitting surface is not rotationally symmetric,
   wherein the optical lens provided on an optical path between the light source and the first light guide, and
   wherein the optical lens is configured to allow the incident angle β incident at the first light guide to meet $\beta < \arcsin \sqrt{n^2-1}$, where n is a refractive index of the first light guide.

2. The illumination device according to claim 1, wherein the light emitting surface is a portion of a side surface of a right cone or a frustum of a right cone.

3. The illumination device according to claim 2, wherein an axis of the right cone or the frustum of the right cone is parallel to and does not coincide with a center line of the first light guiding portion.

4. The illumination device according to claim 2, wherein the second light guiding portion further comprises a first reflective surface, and a combined surface of the light emitting surface and the first reflective surface is rotationally symmetric about a central axis of the first light guide.

5. The illumination device according to claim 1, wherein the light emitting surface is a side surface of an oblique cone or a frustum of an oblique cone.

6. The illumination device according to claim 1, wherein the light emitting surface is at least a portion of side surfaces of a wedge-shaped body.

7. The illumination device according to claim 1, wherein the second light guiding portion comprises a first bottom surface and a second bottom surface which are opposite to each other, the second bottom surface is disposed at a distal end of the second light guiding portion, and the second bottom surface is provided with a second reflective layer.

8. The illumination device according to claim 1, wherein the first light guiding portion has a cylindrical structure or a frustum structure, and the first light guiding portion and the second light guiding portion are integrally formed.

9. The illumination device according to claim 8, wherein the second light guiding portion comprises a third reflective surface, and the third reflective surface and at least a portion of a side surface of the first light guiding portion form a continuous surface.

10. The illumination device according to claim 1, wherein a cross section of the first light guiding portion perpendicular to the center line of the first light guide has a square structure having two rounded corners, and an orthographic projection of a vertex of the second light guiding portion on the cross section is located on a side away from the two rounded corners.

11. The illumination device according to claim 1, wherein the light emitting surface is provided with a phosphor layer.

12. The illumination device according to claim 1, wherein the first light guide further comprises:
    a heat dissipation layer provided on at least a portion of a side surface of the first light guiding portion and configured to dissipate heat of the first light guide; and
    a transparent adhesive layer configured to adhere the heat dissipation layer to the side surface of the first light guiding portion to conduct the heat of the first light guide to the heat dissipation layer, wherein a refractive index of the transparent adhesive layer is lower than a refractive index of the first light guide.

13. The illumination device according to claim 1, further comprising:
    an optical lens provided on an optical path between the light source and the first light guide such that an incident angle of the light emitted by the light source at the first light guide is smaller than a predetermined value.

14. The illumination device according to claim 1, further comprising:
    a second light guide comprising a third light guiding portion and a fourth light guiding portion,
    wherein the light emitted by the light source is at least partially coupled into the third light guiding portion and emitted from a light emitting surface of the fourth light guiding portion, and wherein a distal end of the first light guide is disposed oppositely and abuts against to a distal end of the second light guide.

15. The illumination device according to claim 1, further comprising:
a light reflective bowl, wherein the second light guiding portion is provided at a focus of the light reflective bowl, and the light reflective bowl is configured to reflect the light emitted from the light emitting surface to outside.

16. An illumination device, comprising:
a light source; and
a first light guide comprising a first light guiding portion; and
a second light guiding portion,
wherein the second light guiding portion comprises a light emitting surface, and light emitted by the light source is at least partially coupled into the first light guiding portion and emitted from the light emitting surface of the second light guiding portion,
wherein a cross sectional area of the second light guiding portion perpendicular to a center line of the first light guide is gradually decreasing along a direction of an optical axis of the light source,
wherein the light emitting surface is not rotationally symmetric, and
wherein the light emitting surface is provided with a scattering portion layer.

17. The illumination device according to claim 16, wherein the scattering portion is a scattering structure.

18. The illumination device according to claim 16, wherein the scattering portion comprises scattering particles and a carrier.

19. An illumination device, comprising:
a light source;
a first light guide comprising a first light guiding portion; and
a second light guiding portion,
wherein the second light guiding portion comprises a first bottom surface and a second bottom surface which are opposite to each other, the second bottom surface is disposed at a distal end of the second light guiding portion, and the second bottom surface is provided with a second reflective layer,
wherein the second light guiding portion comprises a light emitting surface, and light emitted by the light source is at least partially coupled into the first light guiding portion and emitted from the light emitting surface of the second light guiding portion,
wherein a cross sectional area of the second light guiding portion perpendicular to a center line of the first light guide is gradually decreasing along a direction of an optical axis of the light source,
wherein the light emitting surface is not rotationally symmetric, and
wherein the light emitting surface is a portion of a side surface of a frustum.

20. The illumination device according to claim 19, wherein the light emitting surface is a portion of a side surface of a frustum of a right cone or a side surface of a frustum of an oblique cone.

* * * * *